United States Patent [19]

Ruoti et al.

[11] 4,101,532

[45] Jul. 18, 1978

[54] PROCESS FOR THE PRODUCTION OF HIGH VISCOSITY POLYAMIDE BY ADDING ALKYLENE CARBONATE TO MOLTEN POLYAMIDE

[75] Inventors: Vincenzo Ruoti, Varese; Felice Farioli, Fagnano Olona, both of Italy

[73] Assignee: SNIA VISCOSA Società Nazionale Industria Applicazioni Viscosa S.p.A., Italy

[21] Appl. No.: 757,934

[22] Filed: Jan. 10, 1977

[30] Foreign Application Priority Data

Jan. 22, 1976 [IT]  Italy ............................. 19471 A/76

[51] Int. Cl.$^2$ ............................................. C08G 69/48
[52] U.S. Cl. .................................... 528/311; 528/333; 526/1
[58] Field of Search ..................... 260/78 SC, 78 L

[56] References Cited

U.S. PATENT DOCUMENTS

| | | | |
|---|---|---|---|
| 2,835,653 | 5/1958 | Haas et al. | 260/78 SC |
| 3,378,532 | 4/1968 | Fritz et al. | 260/78 SC |
| 3,476,711 | 11/1969 | Muller et al. | 260/78 SC |
| 3,496,149 | 2/1970 | Tsunawaki et al. | 260/78 SC |

*Primary Examiner*—Harold D. Anderson
*Attorney, Agent, or Firm*—McGlew and Tuttle

[57] ABSTRACT

Polyamide compositions having a high viscosity in the molten state are produced by preparing a polyamide, adding to the polyamide while the same is in the molten state, an alkylene carbonate in an amount from 0.1 to 2% by weight, and preferably from 0.4 to 0.9% by weight of the polyamide, and extruding the resulting composition. The alkylene carbonate containing polyamide composition may be dried under reduced pressures at temperatures comprised between 110° and 210° C. The preferred polyamide is polyamide-6 (polycapronamide) and the preferred alkylene carbonates are propylene and ethylene carbonates. The resulting compositions can be made into chips suitable for processing by known extrusion and molding techniques.

6 Claims, No Drawings

PROCESS FOR THE PRODUCTION OF HIGH VISCOSITY POLYAMIDE BY ADDING ALKYLENE CARBONATE TO MOLTEN POLYAMIDE

BACKGROUND OF THE INVENTION

1. Field of the Invention

The present invention relates to a process for the production of polyamides having a high viscosity in the molten state, which find application in the plastic products field, that is polyamides adapted to be transformed by the known technique of extrusion, molding, etc. into formed objects having high mechanical characteristics, which may be employed in various fields of industry such as for domestic, electrical, mechanical applications, etc.

2. The Prior Art

It is known that polyamides having improved properties of mechanical resistance may be obtained by the addition to the starting monomers of particular additives, such as phosphoric acid or alkylene carbonates, adapted to cross-link the polymer which is formed or at any rate to increase its degree of polymerization with respect to the conventional polymers prepared in the absence of such additives; polyamides having a higher relative viscosity and an improved resistance to mechanical stresses are thus obtained.

Such known processes however are not free from defects.

Thus for instance the use of phosphoric acid as an additive, gives rise to apparatus problems since said compound is considerably corrosive, and to technological problems since it is difficult to control the amount of said compound and excessive cross-linking and consequent lack of workability of the polymer may be caused thereby. When an alkylene carbonate is used as an additive, according to the known art it is introduced in amounts above 1%, directly in the polycondensation for the purpose of rendering the polymer, which is discharged at a relative viscosity of about 2.6, heat sensitive and therefore post-polycondensable in solid phase until a relative viscosity of 3.2 – 3.3 is reached. These processes however, further lead to drawbacks in the polymerization stage.

It was also known to improve the dyeability of the polyamides by adding ethylene carbonate to the monomers in amounts below 1%, but in that case no significant viscosity increase was obtained, and therefore this process is adapted only to cases in which such an increase is not desired.

SUMMARY OF THE INVENTION

The Applicants have now surprisingly found that if an alkylene carbonate is added in an amount less than 2% by weight to a polyamide (obtained by normal polymerization of the base monomer) in the stage of its extrusion from an extruder, a marked increase in the viscosity of the molten polymer is obtained which is fully satisfactory for the production of polyamide chips to be processed by techniques requiring high melt strength, such as for instance the blow molding of hollow bodies and thermoforming.

An object of the present invention is therefore a process for the production of polyamides having a high viscosity in the molten state, characterized by the fact that an alkylene carbonate is added to a polyamide in the molten state in an amount from 0.1 to 2% by weight of the polyamide charged into the extruder.

The addition of the alkylene carbonate according to the present invention, may be effected in any way known in the art, but is preferably effected by mixing said carbonate to said polyamide in the molten state in the stage of its extrusion from an extruder.

Further to enhance the cross-linking effect of the alkylene carbonate, a polymer obtained by the process of the invention may subsequently be dried in vacuum ovens, at residual pressures below 5 mmHg, at a temperature comprised between 110 and 210° C, preferably from 140° to 180° C.

The duration of said drying is preferably from 5 to 48 hours according to the degree of vacuum, to the temperature and to the cross-linking degree which it is desired to obtain. More particularly, the drying period is inversely proportional to the temperature at which the product is utilized and is proportional to the desired cross-linking degree.

As alkylene carbonate there is preferably employed propylene carbonate and still more preferably ethylene carbonate.

The preferred amount of said alkylene carbonate is comprised between 0.4 and 0.9% by weight of the polyamide charged into the extruder.

Any polyamide known in the art may be processed according to the invention, such as for instance the polyamide obtained by polycondensation of aminoacids, lactams, diacids + diamines, and preferably $\epsilon$-caprolactam.

By the process according to the invention it is therefore possible to obtain a polyamide having a high polycondensation degree, which may be further increased in the drying phase, so as to obtain a polymer having a very high viscosity in the molten state, which may be processed by techniques for which up to now the polyamides were not adapted because of their low viscosities in the molten state, for instance blow molding.

The polyamides having a high degree of viscosity in the molten state, obtained by the process according to the invention, are a further object of the present invention.

The fact that such an increase in the viscosity of the molten products is obtained by the invention is surprising for two reasons: first of all, there was no reason to believe that such a result could be obtained by adding an alkylene carbonate to the already prepared polymer, inasmuch as the alkylene carbonate in polymerization obviously acts as a cross-linking comonomer and it was absolutely unforeseeable that such an action would occur — even if does actually occur — when the alkylene carbonate is added to the finished polymer; secondly, it is absolutely surprising, and actually unexplainable, that the addition of the alkylene carbonate to the already prepared polymer produces a viscosity increase of the molten product which is much higher than that which would be obtained by adding the carbonate as a comonomer in the polymerization. That this fact has been observed, suggests that the alkylene carbonate acts on the finished polymer in a different way from that in which it acts on the monomers in the polymerization stage, and that the structure of the polymer obtained according to the present invention is different from the structure of a polymer obtained by adding the same amount of alkylene carbonate in the polymerization stage. However the Applicants do not possess conclusive scientific data on these questions and therefore does not wish to be bound to any theoretical explanation of the phenomena.

The formed objects constituted at least in part by the polyamide obtained by the process according to the invention are a further object of the present invention.

DETAILED DESCRIPTION OF PREFERRED EMBODIMENTS

The following examples are illustrative but not limitative.

EXAMPLE 1

A polyamide-6(polycapronamide) having a relative viscosity $[\eta_{rel}] = 4.30$ (the relative viscosity $[\eta_{rel}]$ is measured in 96% sulphuric acid at 20° C and at a concentration of 1 g/dl) is mixed with 0.5% wi weight of ethylene carbonate

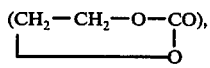

and is extruded from a twin-screw CREUSOT-LOIRE extruder while being degassed, the whole under reaction and temperature conditions that are normal for a polyamide-6 having the said viscosity (screw turns = 60 turns/min, temperatures variable from 280° C to 255° C).

The polymer obtained after the extrusion, which has a relative viscosity of 4.67, is conveyed to a dryer operating at 180° C and at a residual pressure of 0.1 mmHg and is left therein.

The polyamide exhibits a $[\eta_{rel}]$ of 5.38 after 24 hours and of 5.60 after 48 hours. The polymer after drying exhibits a good degree of white and its M.I. (melt index) determined by the ASTM method is so low that the weight load must be increased in order to obtain significant measures.

EXAMPLE 2

0.7% of ethylene carbonate is added to a polyamide-6, having an average viscosity $[\eta_{rel}] = 3.90$, measured as hereinbefore. The mixture is extruded under the conditions indicated in Example 1, and the relative viscosity increases slightly to 4.06. The polymer is dried for 24 hours at 200° C under a residual pressure of 0.1 mmHg, and its relative viscosity rises to 6.03.

A sample of the same polymer, to which however no ethylene carbonate has been added, and which is subjected to the same extrusion and drying treatment, has a relative viscosity of only 4.12.

EXAMPLE 3

A polyamide-6 having the average viscosity of the previous example ($[\eta_{rel}] = 3.90$), after having been extruded with the addition of 0.7% of ethylene carbonate, is dried for 24 hours at 135° C (Pressure = 0.1 mmHg); a polymer is obtained having $[\eta_{rel}] = 4.33$. If the drying phase is prolonged for another 24 hours the relative viscosity further increases to 4.52.

We claim:

1. Process for the production of polyamide composition having a high viscosity in the molten state which comprises preparing an original polyamide, adding to said polyamide in the molten state an alkylene carbonate in an amount from 0.1 to 2% by weight of the polyamide, and extruding the resulting alkylene carbonate containing polyamide composition, thereafter subjecting said composition to heat treatment under a vacuum at residual pressure below 5 mmHg, at a temperature between about 110° C and 210° C, whereupon the relative viscosity of said composition is markedly raised relative to the original and extruded polyamide.

2. Process according to claim 1, wherein the alkylene carbonate is employed in an amount from about 0.4 to about 0.9% by weight of the original polyamide.

3. Process according to claim 1, wherein the heat treatment is effected for a period from about 5 to about 48 hours.

4. Process according to claim 1, wherein the alkylene carbonate consists essentially of ethylene carbonate.

5. Process according to claim 1, wherein the polyamide consists essentially of polycaproamide.

6. Process according to claim 1, wherein the heat treatment is effected at a temperature from about 140° to about 180° C whereupon the relative viscosity, as measured in 96% sulfuric acid at 20° C and at a concentration of 1 g dl, of said composition is from at least about 0.7 to about 6.3 with respect to the original polyamide prior to extruding the alkylene carbonate containing polyamide composition.

* * * * *